US010145086B2

(12) United States Patent
Huth

(10) Patent No.: US 10,145,086 B2
(45) Date of Patent: Dec. 4, 2018

(54) APPARATUS FOR BLOCKING AND FOR ADJUSTING A PRESSURE

(71) Applicant: HYDAC SYSTEM GMBH, Sulzbach/Saar (DE)

(72) Inventor: Heinz-Peter Huth, Ueberherrn (DE)

(73) Assignee: HYDAC SYSTEM GMBH, Sulzbach/Saar (DE)

( * ) Notice: Subject to any disclaimer, the term of this patent is extended or adjusted under 35 U.S.C. 154(b) by 234 days.

(21) Appl. No.: 15/104,256

(22) PCT Filed: Nov. 20, 2014

(86) PCT No.: PCT/EP2014/003095

§ 371 (c)(1),
(2) Date: Jun. 14, 2016

(87) PCT Pub. No.: WO2015/106777

PCT Pub. Date: Jul. 23, 2015

(65) Prior Publication Data

US 2016/0312806 A1 Oct. 27, 2016

(30) Foreign Application Priority Data

Jan. 14, 2014 (DE) ........................ 10 2014 000 696

(51) Int. Cl.
*F15B 1/02* (2006.01)
*E02F 9/22* (2006.01)
(Continued)

(52) U.S. Cl.
CPC .......... *E02F 9/2217* (2013.01); *B60G 17/005* (2013.01); *B60G 17/056* (2013.01);
(Continued)

(58) Field of Classification Search
CPC .... E02F 9/2207; E02F 9/2217; B60G 17/056; B60G 17/005; B60G 2202/154;
(Continued)

(56) References Cited

U.S. PATENT DOCUMENTS 6,167,701 B1 1/2001 Hatcher et al.
6,279,316 B1 * 8/2001 Vigholm .............. E02F 9/2217 60/413

(Continued)

FOREIGN PATENT DOCUMENTS

| | | |
|---|---|---|
| DE | 197 54 828 | 6/1999 |
| DE | 199 31 027 | 2/2000 |
| DE | 100 63 101 | 6/2002 |
| DE | 10 2004 033 890 | 2/2006 |
| DE | 10 2008 057 723 | 5/2010 |
| EP | 1 571 267 | 9/2005 |

(Continued)

OTHER PUBLICATIONS

International Search Report (ISR) dated Mar. 17, 2015 in International (PCT) Application No. PCT/EP2014/003095.

*Primary Examiner* — F. Daniel Lopez
*Assistant Examiner* — Michael Quandt
(74) *Attorney, Agent, or Firm* — Wenderoth, Lind & Ponack, L.L.P.

(57) ABSTRACT

An apparatus (10) blocks and adjusts a pressure for a hydraulically controllable actuator (12), particularly a lifting unit (16) of a machine (18). The apparatus (10) allows a working chamber (20, 22) to be selectively connected to a pressure supply unit (94) having a storage device (34) or to a discharge end (66), in particular a reservoir end, by a valve unit (38). In a controlling position of the valve unit (38), when the storage pressure in the storage device (34) is greater than the working pressure in the working chamber (20) of the actuator (12), the storage pressure is relieved in
(Continued)

the direction of the discharge end (66) until the working pressure has been reached.

14 Claims, 2 Drawing Sheets

(51) Int. Cl.
*B60G 17/056* (2006.01)
*B60G 17/005* (2006.01)
*F15B 20/00* (2006.01)
*E02F 3/43* (2006.01)
*F15B 11/00* (2006.01)
*E02F 3/34* (2006.01)

(52) U.S. Cl.
CPC ............ *E02F 3/431* (2013.01); *E02F 9/2203* (2013.01); *E02F 9/2207* (2013.01); *F15B 1/02* (2013.01); *F15B 1/021* (2013.01); *F15B 11/003* (2013.01); *F15B 20/007* (2013.01); *B60G 2202/154* (2013.01); *B60G 2204/4605* (2013.01); *B60G 2300/09* (2013.01); *E02F 3/34* (2013.01); *F15B 2211/625* (2013.01); *F15B 2211/85* (2013.01)

(58) Field of Classification Search
CPC .............. B60G 2204/4605; F15B 1/021; F16F 15/0275; F16F 15/027
See application file for complete search history.

(56) References Cited

U.S. PATENT DOCUMENTS

| | | | | |
|---|---|---|---|---|
| 6,351,944 | B1 | 3/2002 | Fertig et al. | |
| 6,357,230 | B1 * | 3/2002 | A'Hearn ............... | E02F 9/2207 60/413 |
| 7,117,670 | B2 * | 10/2006 | Kuhn ................... | E02F 9/2207 60/469 |
| 2005/0062239 | A1 | 3/2005 | Shore | |
| 2011/0197573 | A1 | 8/2011 | Honsbein | |

* cited by examiner

APPARATUS FOR BLOCKING AND FOR ADJUSTING A PRESSURE

FIELD OF THE INVENTION

The invention relates to an apparatus for locking and adjustment of pressure for a hydraulically controllable actuator, in particular in the form of a lifting mechanism of a working device. At least one working chamber of the actuator can be selectively connected to a pressure supply device, comprising an accumulator device, or to a discharge side, in particular a tank side, by a valve device.

BACKGROUND OF THE INVENTION

Such devices are used in construction equipment, in particular for wheel loaders. These working devices comprise, amongst other things, an actuator for a lifting mechanism having at least one piston cylinder unit for raising and lowering a loading bucket of this lifting mechanism. During operation of the working device, this loading bucket is exposed to various static and dynamic loads that must be controlled by the actuator device. For instance, to receive a payload, the piston cylinder unit, which is then acting as a lifting cylinder, is usually locked to use the full force of the working device for receiving the payload. While driving with a raised load, however, the actuator is to perform the function of a spring-damper unit to prevent the suspended payload, which preferably is to be held in a constant position, from inadvertently swinging upwards. In addition, provisions are to be taken for the event that overloading of the lifting mechanism occurs during operation.

SUMMARY OF THE INVENTION

An object of the invention is to provide an improved device for locking and adjustment of pressure for a hydraulically controllable actuator device that is safely lockable in a control position for receiving the payload and that, in this position or another control position, provides effective spring-damper characteristics.

This object is basically achieved by an apparatus for locking and adjustment of pressure having, in a control position of a valve device at higher accumulator pressure in the accumulator device than the working pressure in one working chamber of the actuator device, this accumulator pressure relieved to the discharge side until the working pressure is reached.

This device has the advantage that, when switching the device from its locking position to a spring-damper mode, the accumulator pressure is first reduced to the pressure level of the working chamber that is to be connected to the accumulator device and that, upon reaching this pressure level, the fluid communication is established between the working chamber and the accumulator device. In this manner, the pressure level in the accumulator device can be advantageously selected to be substantially higher in the lock mode and can be used exclusively for hydraulic locking of the actuator device.

Preferably, respectively subsequent in time to this operation, the working chamber of the actuator device in this control position is fluidly connected with the accumulator device at a working pressure higher than the accumulator pressure.

According to an advantageous embodiment, the valve device comprises a first logic element that compares the working pressure with the accumulator pressure to drive a control line of a second logic element of the valve device, which second logic element controls a possible fluid communication between the one working chamber and the accumulator device. In this manner, the respective higher pressure of work pressure and accumulator pressure is present at the second logic element in the locking direction. The second logic element thus closes particularly reliably and will be kept closed even under particularly high loads of the actuator device, for example, when driving the bucket of the lifting mechanism into a payload to be received with a wheel loader of the working device.

Advantageously, a first control valve of the valve device is connected in the control line that, in a first control position, in the spring-damper mode, establishes a fluid connection to the discharge side and, in a second control position, the lock mode, connects the control line to the operating pressure of the one working chamber of the actuator device. Consequently, the control line is depressurized in the spring-damper mode so that the second logic element is opened after the pressure is relieved and the one working chamber is connected with the accumulator device. In the lock position, in the closing direction of the second logic element, at a minimum the working pressure is present, which, in conjunction with an energy accumulator, ensures a secure closure of the fluid connection via the second logic element.

Preferably, the actuator device is formed from at least one hydraulic working cylinder, the piston side of which partially delimits the one working chamber and the rod side of which partially delimits another working chamber. Alternative concepts at least partly employ hydraulic motors instead of hydraulic working cylinders.

A third logic element of the valve device may be present for controlling the rod side of the working cylinder. The third logic element is connected to the control line and controlling fluid communication between the rod side and the discharge side. By the third logic element, the rod side is also secured against fluid flowing out in the lock mode of the device. In the spring-damper mode, the third logic element can be used to add fluid from the other working chamber and also to replenish fluid into it, given a corresponding formation of the discharge side.

Particularly preferably, a diaphragm or a flow control valve is connected in the control line between the second logic element and the control valve. The diaphragm or flow control valve causes the fluid pressure upstream of the diaphragm or the flow control valve to be kept at a high level until the accumulator device has emptied enough so that the accumulator pressure has dropped to the level of the working pressure. In this manner, the second logic element—and, if applicable, also the third logic element—is kept locked for a longer time.

Advantageously, the accumulator device can be connected with the pressure supply device for pressure supply of the accumulator device by a second control valve of the valve device, which second control valve is controllable by the pressure in the control line. This switching allows for charging of the accumulator device in the lock mode, and thus, a significant increase of the accumulator pressure. The accumulator pressure can then be very advantageously used for locking the second logic element and, if applicable, also the third logic element. This arrangement allows for locking of the actuator device even under maximum load.

Preferably, an additional supply device is provided for additional supply of the actuator device and other components of a working hydraulic system, in particular for controlling the lifting mechanism of the working device.

These supply devices may, in particular, have directional valves to purposefully feed working fluid into one of the working chambers of the actuator device or discharge working fluid therefrom. The additional supply device permits the control of the actuator device or any additional components of the working hydraulic system.

Preferably, the logic elements are formed by 2/2-way valves. The logic elements are distinguished by the fact that the fluid pressures present at the fluid connections act in the opening direction of the valve. On the opposing control side, the fluid pressure from the control line acts in the closing direction, possibly enforced by an accumulator.

The first control valve can be an electrically controllable 3/2-way valve. The second control valve can be a 2/2-way valve of a different type than those of the logic elements. The 3/2-way valve allows the control line to be connected in a simple manner with the one working chamber of the actuator device or the discharge side at full opening cross-section. The 3/2-way valve is designed such that it can withstand any occurring operating pressure of the actuator device. Advantageously, the 2/2-way valve can be used to resupply the accumulator device with fluid of determinable pressure via a hydraulic pump (fixed or variable capacity pump) of the pressure supply device.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
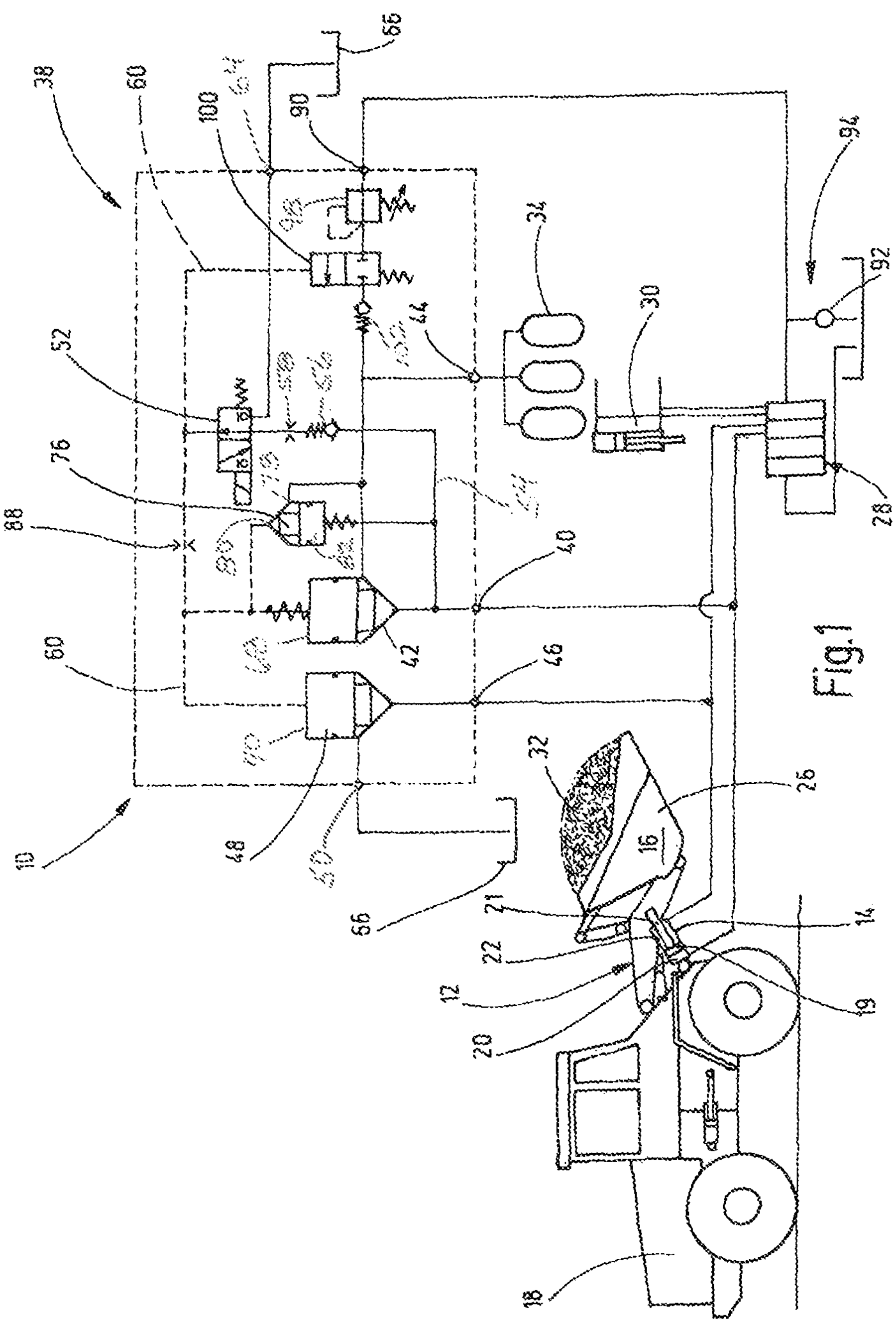
FIG. 1 is at least partially a hydraulic block diagram of an apparatus according to an exemplary embodiment of the invention for locking and adjustment of pressure in a lifting mechanism actuator of a bucket wheel loader.

FIG. 1 shows an apparatus 10 according to an exemplary embodiment the invention for locking and adjustment of pressure for a hydraulically controllable actuator device or actuator 12 in the form of a working cylinder 14 or generally a piston cylinder unit of a lifting mechanism 16 of a working device 18 in the form of a bucket wheel loader. In principle, the actuator device could also be formed as a hydraulic motor (not shown).

The piston cylinder unit 14 comprises a first working chamber 20 on a piston side 19 and a second working chamber 22 on a rod side 21. To move the piston rod unit of the cylinder 14 and the loading bucket 26 attached thereto as part of the lifting mechanism 16 of the wheel loader 18, a supply device 28 of an additional working hydraulic system 30, not explained in detail, is provided. The working hydraulic system 30, controlled by an operator, can be used to independently supply hydraulic fluid alternately to one of the working chambers 20, 22 and to release it therefrom to purposefully move the components of the wheel loader 18 during operation, for example, for raising the loading bucket 26 or for dumping a payload 32 from the loading bucket 26.

Overlayed on this working hydraulic system 30, the apparatus 10 for locking and adjustment of pressure is connected to the actuator device 12. This apparatus 10 establishes fluid communication from the first working chamber 20 to an accumulator device 34 in a spring-damper mode, as required, or interrupts the communication in lock mode. Likewise, the second working chamber 22 of the actuator device 12 can be connected to the discharge side 66, in particular to a tank side, in the spring-damper mode or this fluid communication can be closed in a lock mode.

Figure 2:
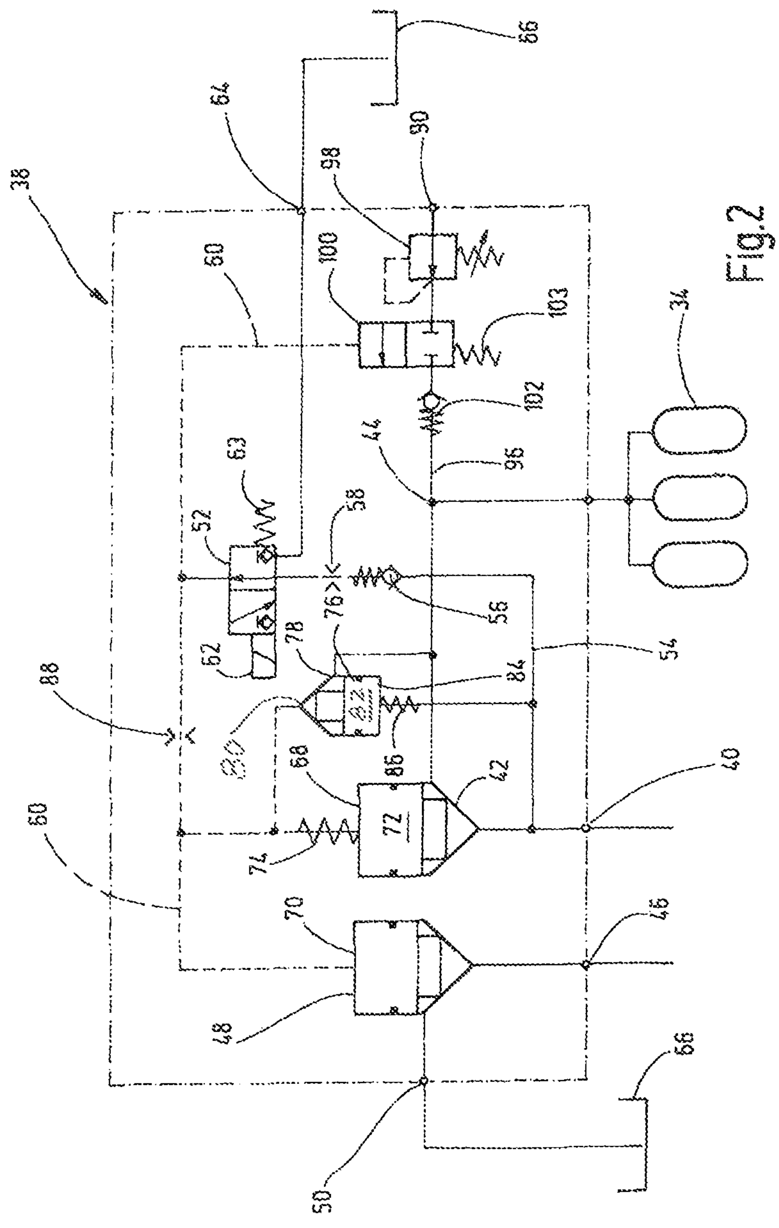
FIG. 2 is an enlarged hydraulic block diagram of the valve device of the apparatus of FIG. 1.

The apparatus 10 includes a valve device 38, shown in an enlarged view in FIG. 2, with connections 40, 46 for the working chambers 20 and 22, respectively. In the present embodiment, the first working chamber 20 of the actuator device 12 is connected to a first fluid connection 40 of the valve device 38. The respective fluid pressure present at the first fluid connection 40 is referred to as the working pressure. Via a second logic element 42 in the form of a 2/2-way valve, the first fluid connection 40 can be further connected with an accumulator connection 44, to which the accumulator device 34 is connected. The respective fluid pressure present at the accumulator connection 44 is referred to as the accumulator pressure. In the present embodiment, the accumulator device 34 comprises three hydraulic accumulators of conventional design, such as piston accumulators.

Extending parallel to the first fluid connection 40, the second working chamber 22 of the actuator device 12 is connected to a second fluid connection 46 of the valve device 38. Via a third logic element 48 in the form of a 2/2-way valve, this second fluid connection 46 can be connected with a discharge connection 50, leading to the discharge side (tank) 66.

In addition to the second logic element 42, a first control valve 52 is connected to the first fluid connection 40. In addition, a first check valve 56, preferably spring-loaded, which opens toward the first control valve 52, and a diaphragm 58 or throttle downstream from this first check valve 56 are present in the connecting line 54 leading from the first fluid connection 40 to the first control valve 52. The first control valve 52 is preferably constructed as a 3/2-way switching valve. In the illustrated, currentless first control position of the first control valve 52, a control line 60 is connected to the first fluid connection 40. By an electrical actuator device (solenoid) 62, the first control valve 52 can be switched against the action of a return spring 63 into a second control position in which the control line 60 is connected to a further discharge connection 64, to which in turn the tank or discharge side 66 is connected.

Via the control line 60, the control sides 68, 70 of the second logic element 42 and the third logic element 48, respectively, are permanently connected to the first control valve 52 in its switching position shown in the figures. Accordingly, in lock mode, these control sides 68, 70 can be pressurized with the fluid pressure at the first fluid connection 40. Since this fluid pressure is present at the second logic element 42 in both the opening direction and in the lock direction, and since a valve piston 72 of the second logic element 42 is also pressurized in closing direction by an energy accumulator (compression spring) 74, the second logic element 42 is securely closed in its lock position. Likewise, the third logic element 48 can be pressurized in the closing direction by the fluid pressure at the first fluid connection 40 in the lock direction and by a much lower fluid pressure at the second fluid connection 46 in the opening direction. Therefore, the third logic element 48 is also securely closed in lock mode. In spring-damper mode, however, the fluid can flow from the control line 60 to the discharge side 66 and to the tank via the then triggered valve 52 (left switch representation) and the discharge connection 64. In this manner, the corresponding control sides 68, 70 of the second logic element 42 and the third logic element 48 are relieved so that these logic elements 42, 48 can switch into the open position (not shown).

To always ensure the locking of the second logic element 42 and the third logic element 48 even at a higher load, the control sides 68, 70 of these logic elements 42, 48 are pressurized with the respective higher pressure of the pressures at the first fluid connection 40 and the accumulator connection 44. For this purpose, in addition to the first check valve 56, a first logic element 76 is provided in parallel in the connection line 54 from the first fluid connection 40 and the first control valve 52. The first logic element 76 includes a fluid inlet 78 connected to the accumulator connection 44. A fluid outlet 80 of the first logic element 76 is connected to the control line 60. The fluid pressures at the fluid inlet 78 and the fluid outlet 80 of the first logic element 76 pressurize a valve piston 82 of this valve in the opening direction. On the opposite control side 84, the fluid pressure at the first fluid connection 40 and an energy accumulator (pressure spring) 86 act on the valve piston 82 of the first logic element 76 in the lock direction.

Furthermore, a diaphragm 88 or a flow control valve (not shown) is connected in the control line 60 between the logic elements 42, 48, 76 and the first control valve 52. At the first logic element 76, the pressure at the first fluid connection 40, i.e., the working pressure in the working chamber 20 of the actuator device 12, is continuously being compared with the pressure prevailing at the accumulator connection 44, i.e., the accumulator pressure. If the accumulator pressure is higher than the working pressure, the first logic element 76 opens and fluid from the accumulator device 34 flows into the control line 60. In locked mode, wherein the first control valve 52 is kept deenergized in the switching position shown, thus connecting the control line 60 with the first fluid connection 40, the first check valve 56 prevents fluid from flowing on this path from the accumulator device 34 to the first fluid connection 40 and further into the actuator device 12. In the lock direction of the second logic element 42 and the third logic element 48, higher accumulator pressure is now present instead of the lower working pressure. The second logic element 42 and the third logic element 48 are therefore closed tightly and remain in the closed position shown even at higher loads and possible pressure shocks originating from the actuator device 12.

In spring-damper mode, in which the first control valve 52 relieves the control line 60 in the direction of the discharge side 66, the diaphragm 88 or the flow control valve in the control line 60 prevents the built up pressure from dropping on the control side 68, 70 of the second logic element 42 and the third logic element 48 as long as fluid at higher pressure keeps flowing from the accumulator device 34 via the first logic element 76. Hence, in spring-damper mode, the fluid communications are kept closed by the second logic element 42 and the third logic element 48 until the accumulator device 34 has emptied enough for the accumulator pressure to approach the working pressure in the working chamber 20. Upon reaching this pressure, the first logic element 76 is then closed by its energy accumulator 86. This action in turn causes the fluid pressure in the entire control line 60 to drop to the pressure at the discharge side 66 (tank pressure) and the second logic element 42 and the third logic element 48 switch into the open position. In this manner, the piston-side first working chamber 20 is fluidly connected with the accumulator device 34 and the desired spring-damper effect of the lifting mechanism 16 is achieved. The second working chamber 22 (rod side) can then be resupplied with fluid if needed via the supply device 28 of the working hydraulic system 30.

Hence, in a control position of the valve device 38, which position corresponds to the spring-damper mode, if the accumulator pressure of the accumulator device 34 is higher than the working pressure in the one working chamber 20 of the actuator device 12, the accumulator pressure is relieved into the discharge side 66 until this working pressure is reached. In this control position, if the working pressure in the one working chamber 20 is higher than the accumulator pressure, the working chamber 20 is fluidly connected with the accumulator device 34.

To resupply the accumulator device 34, the accumulator device 34 is connected to a hydraulic pump 92 of another pressure supply device 94, which is part of the previously presented working hydraulic system 30, via a pressure supply connection 90. In the connecting line 96 coming from the pressure supply connection 90 and leading in the direction of the accumulator connection 44, a pressure regulator or relief valve 98 as a pressure closing valve, a second control valve 100, and a second, preferably spring-loaded, check valve 102 are provided. The valve 98 ensures that the accumulator device 34 can be resupplied only up to a predeterminable maximum accumulator pressure. The second control valve 100 is, as shown, constructed as a 2/2-way valve of a design different from the logic valves and is also triggered by the control line 60. Once the control line 60 is relieved of pressure in the spring-damper mode, the second control valve 100 is closed, as shown, due to the action of a return spring and the connection line 96 between the pressure supply connection 90, and accumulator connection 44 is interrupted so that in this mode no resupply of the accumulator device 34 takes place. In lock mode, at least the working pressure is present at the control line 60, which may be higher than the accumulator pressure so that the second control valve 100 opens the connection line 96 in this mode and permits resupplying the accumulator device 34 to a higher pressure level. The second check valve 102 opens in the direction of the accumulator connection 34, preventing any possible, undesired backflow of hydraulic fluid in the direction of the pressure supply connection 90.

This arrangement results in the following sequence in the operation of the apparatus. Via the second logic element 42, the piston side in the form of the first working chamber 20 of the lifting or working cylinder 14 can be connected to the individual hydraulic accumulators of the accumulator device 34. Via the third logic element 48, the rod side in the form of the second working chamber 22 of the working cylinder 14 can be connected to the tank and the discharge side 66, respectively. The individual logic elements are controlled via the triggered 3/2-way valve 52. If the 3/2-way valve or 3/2-way switching valve is in its non-energized basic position, shown in the figures, the pressure in the first working chamber 20 is fluidly connected with the control surfaces 68 and 70 of the two logic elements 42 and 48, respectively, via the check valve 56 and in turn via the 3/2-way valve 52. The logic elements 42 and 48 then close the connections to accumulators of the accumulator device 34 and the discharge side 66, respectively, free from oil leakage. At the same time, this control pressure in the control line 60 also switches the 2/2-way valve to the open position (not shown). The accumulators of the accumulator device 34 are then resupplied from the working hydraulic system (pressure supply device 94) via said 2/2-way valve 100 and the second check valve 102 until the system pressure is reached or, when using a normally open pressure valve of the type of a pressure regulating or pressure relief valve 98, until a maximum manifold pressure is reached depending on the setting on the valve 98.

The first logic element 76 compares the accumulator pressure of the accumulator device 34 with the cylinder or working pressure, as is present in the first working chamber 20 of the working cylinder 14. If the accumulator pressure is higher than the cylinder or working pressure, the first logic element 76 goes into an open position and transfers the accumulator pressure to the control surfaces 68 and 70 of the second logic element 42 or third logic element 48, respectively. The control surfaces 68, 70 are always connected to the respective highest pressure of the first working chamber 20 or the accumulator device 34. The first check valve 56 prevents a connection between the accumulator device 34 and the first working chamber 20 via the control line 60. The second and third logic elements 42 and 48 are thus securely closed (lock mode).

To add the individual accumulators of the accumulator device 34 (spring-damper mode), the 3/2-way valve is then electrically triggered via the actuating device 62 with the result that the control line 60 is relieved to tank or drain side 66. Due to the relief of the control line 60 and also as a result of the action of the return spring 103, the 2/2-way valve 100 is then brought into its closed or locking position, shown in the figures, thereby closing the accumulator supply of the accumulator device 34 from the working hydraulic system 30 with the pressure supply device 94.

If the accumulator pressure is now higher than the working or cylinder pressure in the working chamber 20, the first logic element 76 is in the open position. The pressure of the accumulator device 34 is then relieved in a controlled manner via the diaphragm 88. The dynamic pressure upstream of the diaphragm 88 continues to keep the second and third logic elements 42 and 48 in the closed position during the relieving of the accumulator. Once the accumulator pressure has been lowered to the working or cylinder pressure, the first logic element 76 then closes and the control surfaces 68, 70 of the two logic elements 42 and 48, respectively, are relieved to discharge side 66 down to the tank pressure, and the connection of the lifting or working cylinder 14 opens to the accumulators of the accumulator device 34 and to the tank or the discharge side 66. The lifting or working cylinder 14 with its working chamber 20 is then connected with the accumulators of the accumulator device 34 and the other working chamber 22 is connected to the tank via the discharge connection 50.

The device 10 according to the invention for locking and adjustment of pressure has the advantage that, when switching the device 10 to a spring-damper mode, the accumulator pressure is first reduced to the pressure level of the first working chamber 20 that is to be connected to the accumulator device 34 and that, only when this pressure level is reached, is the fluid communication established between the working chamber 20 and the accumulator device 34. In this manner, the pressure level in the accumulator device 34 can advantageously be substantially higher in the lock mode and can be used for hydraulic locking of the actuator device 12. To enhance the locking effect, the accumulator pressure in the accumulator device 34 can be increased further by resupplying to a predeterminable maximum accumulator pressure. This operation results in a smooth and unrestrained operation with the device.

Overall in this manner, a device 10 is proposed that, in lock mode, can withstand higher loads on the part of the actuator device 12 and the loading bucket 26, placing loads on it. Under utilization of the same accumulator device 34 at the same, but also at a substantially lower pressure level, provides suspension and damping of the lifting mechanism 16 with the loading shovel 26 being in a spring-damper mode for safe operation of the working machine.

While one embodiment has been chosen to illustrate the invention, it will be understood by those skilled in the art that various changes and modifications can be made therein without departing from the scope of the invention as defined in the claims.

The invention claimed is:

1. An apparatus for locking and adjustment of pressure for a hydraulically controllable actuator device, the apparatus comprising:

a valve device having first and second fluid connections connectable to first and second working chambers, respectively, of an actuator and having a discharge side;

a pressure supply device being connected to an accumulator connection of said valve device, with an accumulator device connected to said accumulator connection; and in a control position of said valve device at an accumulator pressure of said accumulator device higher than a working pressure at said first fluid connection, said accumulator being connected in fluid communication with said discharge side relieving the accumulator pressure until the accumulator pressure reaches the working pressure, said valve device including a first logic element that compares the working pressure with the accumulator pressure driving a control line of a second logic element of said valve device, said second logic element controlling fluid communication between said first fluid connection and said accumulator device, said valve device having a first control valve connected in a control line, said first control valve connecting said discharge side to said control line in fluid communication in a first control position of said first control valve and connecting said control line to said first fluid connection in fluid communication in a second control position of said first control valve.

2. An apparatus according to claim 1 wherein said first fluid connection is connected in fluid communication with said accumulator device at the working pressure at said first fluid connection when the working pressure is higher than the accumulator pressure.

3. An apparatus according to claim 1 wherein the actuator comprises a hydraulic working cylinder having a piston side partially delimiting the first working chamber and a rod side partially delimiting the second working chamber.

4. An apparatus according to claim 3 wherein an additional pressure supply device is selectively connected in fluid communication with the first and second working chambers.

5. An apparatus according to claim 1 wherein said valve device comprises a third logic element controlling fluid flow between said second fluid connection and said discharge side, said third logic element being operable via said second control line.

6. An apparatus according to claim 5 wherein each of said first, second and third logic elements comprise a 2/2-way valve.

7. An apparatus according to claim 1 wherein a throttle is connected in said control line between said second logic element and said first control valve.

8. An apparatus according to claim 1 wherein said accumulator device is selectively connectable with said pressure supply device to pressurize said accumulator device by a second control valve of said valve device, said second control valve being connected to and controlled by pressure in said control line.

9. An apparatus according to claim 8 wherein said first control valve control valve comprises a proportional controllable 3/2-way valve; and said second control valve comprises a 2/2-way valve.

10. An apparatus for locking and adjustment of pressure for a hydraulically controllable device, the valve device comprising:

first and second fluid connections connected to first and second working chambers, respectively, of an actuator;

a tank connection connected to a tank;

an accumulator connection;

an accumulator device connected in fluid communication with said accumulator connection;

a first logic valve connected in fluid communication at opposite ends thereof to said first fluid connection and a control line, respectively, and biased by a spring to a closed position thereof, said first logic valve connecting in fluid communication, said control line to said accumulator device in an open position thereof;

a second logic valve connected in fluid communication at opposite ends thereof to said first fluid connection and said control line, respectively, parallel to said first logic valve, and biased by a spring to a closed position thereof, said second logic valve connecting in fluid communication said accumulator device to said first fluid connection in an open position thereof;

a third logic valve connected at opposite ends thereof to said control line and said second fluid connection, respectively, said third logic valve connecting and blocking fluid communication between said tank connection and said second fluid connection in open and closed positions thereof, respectively; and a first control valve selectively connecting in fluid communication said control line to said first fluid connection and to said tank connection.

11. An apparatus according to claim 10 wherein a pressure supply device selectively connected in fluid communication with said first and second working chambers and said first and second fluid connections.

12. An apparatus according to claim 11 wherein said accumulator device is selectively connectable with said pressure supply device to pressurize said accumulator device by a second control valve of said valve device, said second control valve being connected to and controlled by pressure in said control line.

13. An apparatus according to claim 12 wherein said first control valve control valve comprises a proportional controllable 3/2-way valve; and said second control valve comprises a 2/2-way valve.

14. An apparatus according to claim 10 wherein each of said first, second and third logic valves comprises a 2/2-way valve.

* * * * *